(12) United States Patent
Wang et al.

(10) Patent No.: US 7,161,322 B2
(45) Date of Patent: Jan. 9, 2007

(54) ROBOT WITH A MANIPULATOR ARM

(75) Inventors: Yulun Wang, Goleta, CA (US); Keith Phillip Laby, Santa Barbara, CA (US); Ranjan Mukherjee, East Lansing, MI (US)

(73) Assignee: InTouch Technologies, Inc., Goleta, CA (US)

( * ) Notice: Subject to any disclaimer, the term of this patent is extended or adjusted under 35 U.S.C. 154(b) by 59 days.

(21) Appl. No.: 10/716,792

(22) Filed: Nov. 18, 2003

(65) Prior Publication Data

US 2005/0104547 A1 May 19, 2005

(51) Int. Cl.
G05B 19/04 (2006.01)
B25J 15/02 (2006.01)
B25J 5/00 (2006.01)
G06F 19/00 (2006.01)

(52) U.S. Cl. .............................. 318/568.2; 318/568.21; 318/568.12; 901/6; 901/1; 901/31; 700/245

(58) Field of Classification Search ............. 318/568.2, 318/568.21, 568.25, 568.12; 901/6, 50, 1, 901/29, 23, 31, 32, 38; 700/245, 264, 257, 700/259; 701/2, 22
See application file for complete search history.

(56) References Cited

U.S. PATENT DOCUMENTS

| | | | |
|---|---|---|---|
| 5,374,879 A | 12/1994 | Pin et al. | |
| 5,959,423 A | 9/1999 | Nakanishi et al. | |
| 6,259,806 B1 | 7/2001 | Green | |
| 6,292,713 B1 | 9/2001 | Jouppi et al. | |
| 6,304,050 B1 * | 10/2001 | Skaar et al. ............ | 318/568.11 |
| 6,346,950 B1 | 2/2002 | Jouppi | |
| 6,369,847 B1 | 4/2002 | James et al. | |
| 6,430,471 B1 | 8/2002 | Kintou et al. | |
| 6,463,361 B1 | 10/2002 | Wang et al. | |
| 6,491,701 B1 | 12/2002 | Tierney et al. | |
| 6,496,099 B1 | 12/2002 | Wang et al. | |
| 6,535,793 B1 | 3/2003 | Allard | |
| 6,549,215 B1 | 4/2003 | Jouppi | |

(Continued)

FOREIGN PATENT DOCUMENTS

CA 2289697 A1 11/1998

OTHER PUBLICATIONS

Fumio Kanehiro et al., Virtual Humanoid Robot Platform to Develop Controllers of Real Humanoid Robots without Porting, Proceedings of the 2001 IEEE/RSJ, International Conference on Intelligent Robots and Systems, Maui, Hawaii, USA, Oct. 29-Nov. 3, 2001.*

(Continued)

*Primary Examiner*—Edgardo San Martin
(74) *Attorney, Agent, or Firm*—Ben J. Yorks; Irell & Manella LLP

(57) ABSTRACT

A robot that includes an arm coupled to a platform. The arm includes an actuator that moves a second arm linkage relative to a first arm linkage. In a first mode of operation the actuator moves the second linkage in a first degree of freedom. In a second mode of operation the actuator moves the second linkage in a second degree of freedom. The use of a single actuator to provide two degrees of freedom reduces the number parts and associated cost of the arm. The arm further includes a grasper that can grab an object such as a wheelchair. The robot can be used to push the wheelchair. Commands to operate the robot can be generated at a remote input station and transmitted through a broadband network.

14 Claims, 11 Drawing Sheets

U.S. PATENT DOCUMENTS

| | | | |
|---|---|---|---|
| 6,879,879 B1* | 4/2005 | Jouppi et al. | 700/259 |
| 2001/0054071 A1 | 12/2001 | Loeb | |
| 2002/0027597 A1 | 3/2002 | Sachau | |
| 2002/0057279 A1 | 5/2002 | Jouppi | |
| 2002/0058929 A1 | 5/2002 | Green | |
| 2002/0063726 A1 | 5/2002 | Jouppi | |
| 2002/0120362 A1 | 8/2002 | Lathan et al. | |
| 2002/0130950 A1 | 9/2002 | James et al. | |
| 2002/0141595 A1 | 10/2002 | Jouppi | |
| 2002/0183894 A1 | 12/2002 | Wang et al. | |
| 2003/0050733 A1 | 3/2003 | Wang et al. | |
| 2003/0100892 A1* | 5/2003 | Morley et al. | 606/1 |
| 2003/0151658 A1 | 8/2003 | Smith | |

OTHER PUBLICATIONS

Paulos et al., "A World Wide Web Telerobotic Remote Environment Browser", http://vive.cs.berkeley.edu/capek, 1995.

Telepresence Research, Inc., "Telepresence Mobile Robot System", http://www.telepresence.com/telepresence-research/TELEROBOT/, Feb. 20, 1995.

Zorn, Benjamin G., "Ubiquitous Telepresence", http://www.cs.colorado.edu/~zorn/ut/vision/vision.html, Mar. 5, 1996.

Paulos, et al., "Ubiquitous Tele-embodiment: Applications and Implications", International Journal of Human Computer Studies, Jun. 1997, vol. 46, No. 6, pp. 861-877.

Paulos, et al., "Designing Personal Tele-Embodiment", Presented at the IEEE International Conference on Robotics and Animation, Leuven, Belgium, May 20, 1998.

Harmo et al., "Moving Eye—Interactive Telepresence Over Internet With a Ball Shaped Mobile Robot", 2000.

Loeb, Gerald, "Virtual Visit: Improving Communication for Those Who Need It Most", 2001.

Paulos, Eric John, "Personal Tele-Embodiment", 2001.

Hees, William P., "Communications Design for a Remote Presence Robot", Jan. 14, 2002.

Jacobs et al., "TeleRehab: Applying Telemedicine to Outpatient Physical Therapy", 2002.

Jouppi, et al., :Mutually-Immersive Audio Telepresence, Audio Engineering Society Convention Paper, presented at 113th Convention Oct. 2002.

Jouppi, Norman P., "First Steps Towards Mutually-Immersive Mobile Telepresence", 2002.

Bauer, Jeffrey C., "Service Robots in Health Care: The Evolution of Mechanical Solutions to Human Resource Problems", Jun. 2003.

Eillison et al., "Telerounding and Patient Satisfaction Following Surgery".

* cited by examiner

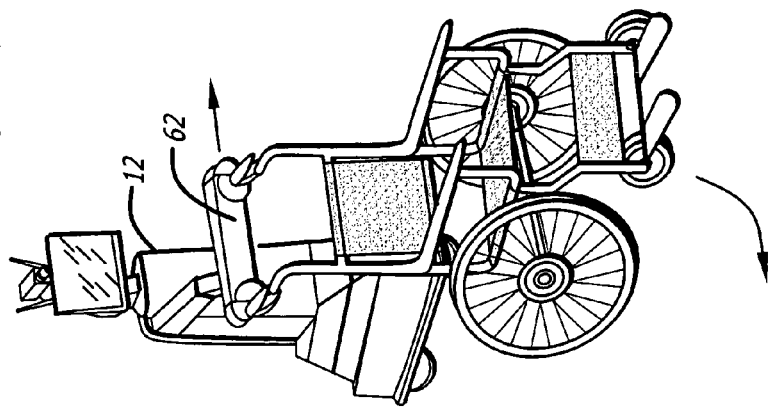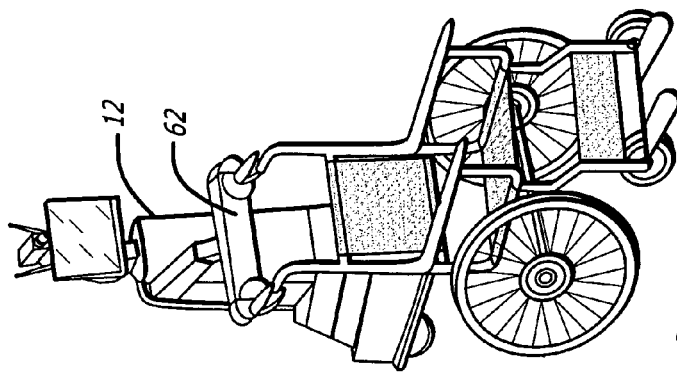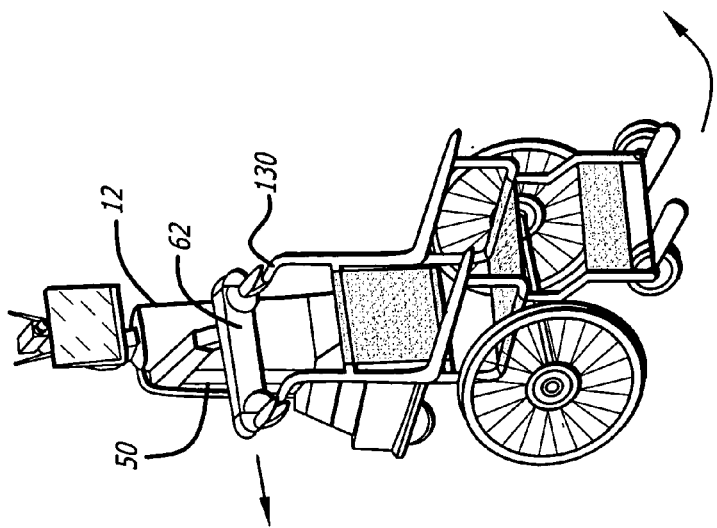

ROBOT WITH A MANIPULATOR ARM

BACKGROUND OF THE INVENTION

1. Field of the Invention

The subject matter disclosed generally relates a manipulator arm of a mobile robot.

2. Background Information

There have been developed different types of robots to provide a magnitude of functions ranging from welding cars to performing surgery. The field of robotics also includes "companion" robots. For example, the assignee of the present application, InTouch-Health, Inc. has developed a mobile robot offered under the trademark COMPANION that can be placed in assisted living homes. The COMPANION has a camera, a monitor, a microphone and speakers that allow a remote operator to conduct a two-way tele-video conference with the occupants of the home. By way of example, the COMPANION allows loved ones to visit an occupant of the assisted living home, or allow a nurse to instruct personnel on how to assist the occupant.

It would be desirable to provide the COMPANION with a manipulator arm to perform additional tasks such as pushing a wheelchair. The ability to push a wheelchair would allow the staff to perform other functions. It would be desirable to provide such an arm while minimizing the number of actuators required to operate the arm. Minimizing the number of actuators reduces the cost and complexity of the robot.

BRIEF SUMMARY OF THE INVENTION

A robot that includes an arm coupled to a mobile platform. The arm includes an actuator that can move a second linkage relative to a first linkage. The actuator can move the second linkage in a first degree of freedom in a first mode and a second degree of freedom in a second mode.

BRIEF DESCRIPTION OF THE DRAWINGS

FIGS. 4a–c are perspective views showing the movement of a wheel chair through manipulation of the robot arm;

DETAILED DESCRIPTION

Disclosed is a robot that includes an arm coupled to a platform. The arm includes an actuator that moves a second arm linkage relative to a first arm linkage. In a first mode of operation the actuator moves the second linkage in a first degree of freedom. In a second mode of operation the actuator moves the second linkage in a second degree of freedom. The use of a single actuator to provide two degrees of freedom reduces the number parts and associated cost of the arm. The arm further includes a grasper that can grab an object such as a wheelchair. The robot can be used to push the wheelchair. Commands to operate the robot can be generated at a remote input station and transmitted through a broadband network.

Figure 1:
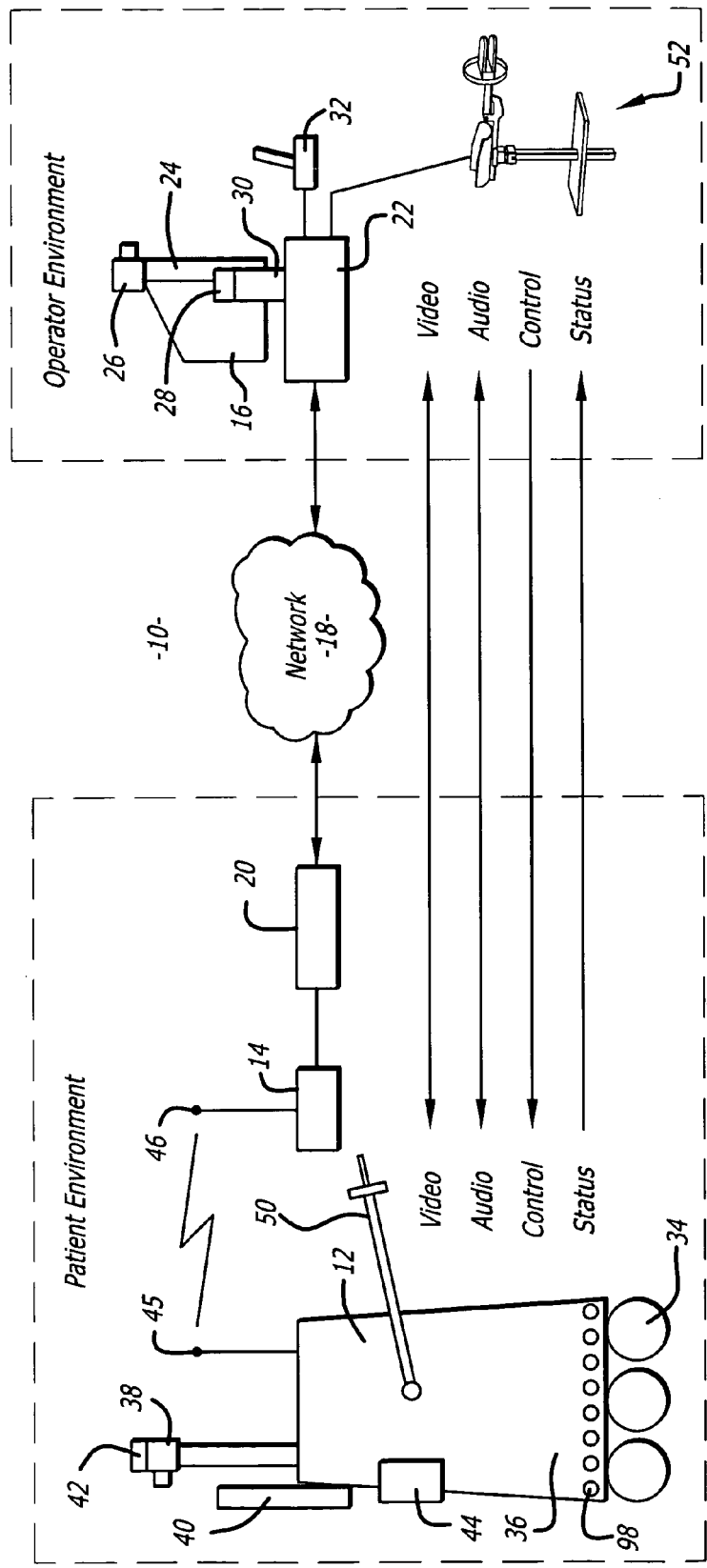
FIG. 1 is an illustration of a robotic system.

Referring to the drawings more particularly by reference numbers, FIG. 1 shows a robotic system 10. The robotic system 10 includes a robot 12, a base station 14 and a remote control station 16. The remote control station 16 may be coupled to the base station 14 through a network 18. By way of example, the network 18 may be either a packet switched network such as the Internet, or a circuit switched network such has a Public Switched Telephone Network (PSTN) or other broadband system. The base station 14 may be coupled to the network 18 by a modem 20 or other broadband network interface device.

The remote control station 16 may include a computer 22 that has a monitor 24, a camera 26, a microphone 28 and a speaker 30. The computer 22 may also contain an input device 32 such as a joystick or a mouse. The control station 16 is typically located in a place that is remote from the robot 12. Although only one remote control station 16 is shown, the system 10 may include a plurality of remote stations. Additionally, although only one robot 12 is shown, it is to be understood that the system 10 may have a plurality of robots 12. In general any number of robots 12 may be controlled by any number of remote stations 16. For example, one remote station 16 may be coupled to a plurality of robots 12, or one robot 12 may be coupled to a plurality of remote stations 16.

The robot 12 includes a movement platform 34 that is attached to a robot housing 36. Also attached to the robot housing 36 are a camera 38, a monitor 40, a microphone 42 and a speaker(s) 44. The microphone 42 and speaker 30 may create a stereophonic sound. The robot 12 may also have an antenna 45 that is wirelessly coupled to an antenna 46 of the base station 14. The system 10 allows a user at the remote control station 16 to move the robot 12 through the input device 32. By way of example, the input device 32 may be a joystick. The robot camera 38 is coupled to the remote monitor 24 so that a user at the remote station 16 can view a patient. Likewise, the robot monitor 40 is coupled to the remote camera 26 so that the patient can view the user. The microphones 28 and 42, and speakers 30 and 44, allow for audible communication between the patient and the user.

The robot 12 may have a manipulator arm 50 that can be used to perform a variety of tasks. The manipulator arm 50 may move in conjunction with movement of a handle 52 located at the remote station 22. The user can cause movement of the robot platform through the joystick 32 and movement of the arm 50 through the handle 52. The commands for both the platform 34 and the arm 50 can be transmitted through the network 18.

The remote station computer 22 may operate Microsoft OS software and WINDOWS XP or other operating systems such as LINUX. The remote computer 22 may also operate a video driver, a camera driver, an audio driver and a joystick driver. The video images may be transmitted and received with compression software such as MPEG CODEC.

Figure 2:
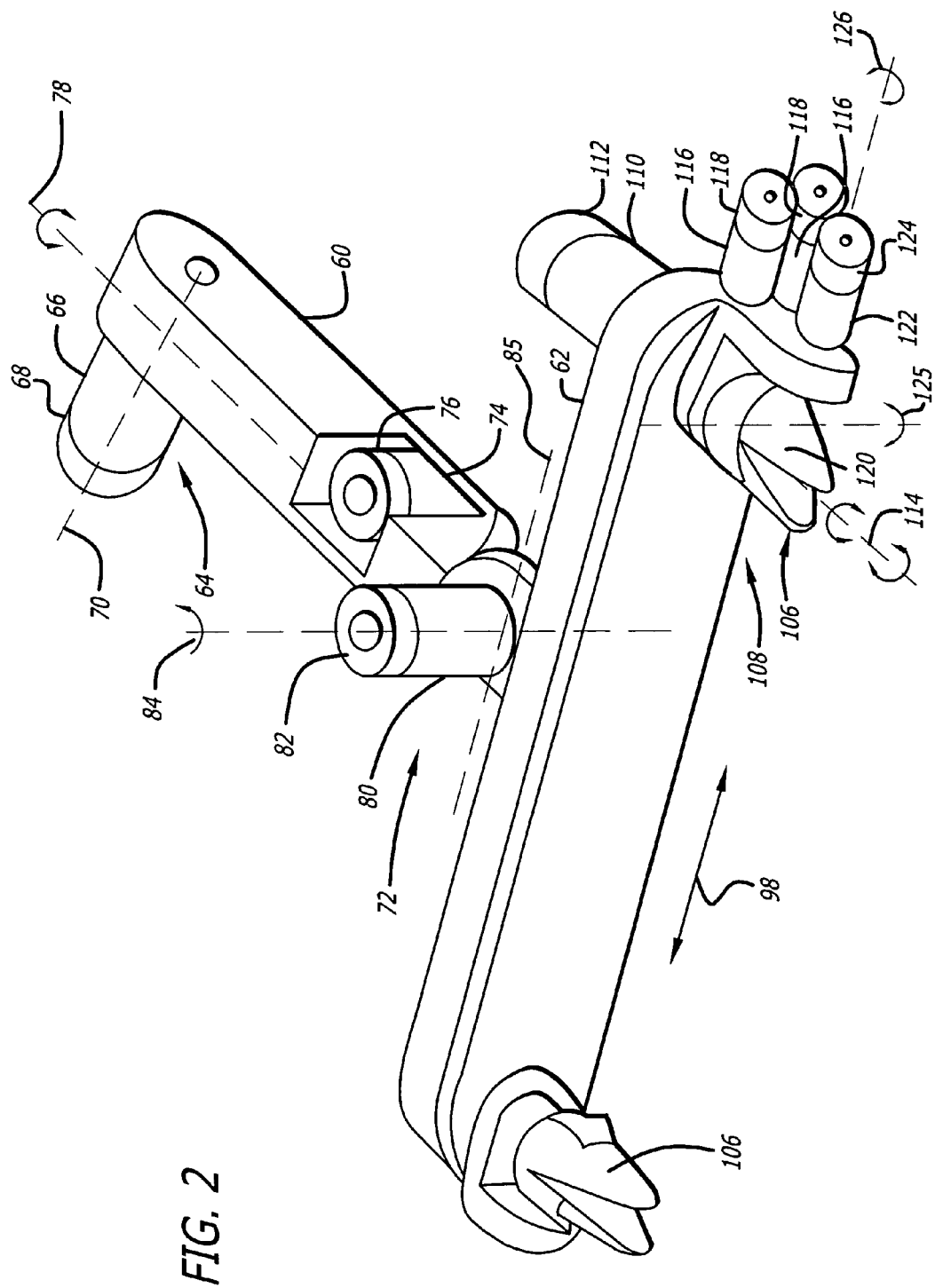
FIG. 2 is a perspective view of an embodiment of a manipulator arm.

FIG. 2 shows an embodiment of a manipulator arm 50. The arm 50 may include a first linkage 60 and a second linkage 62. The first linkage 62 may be coupled to the robot frame (not shown) through a shoulder joint 64. The shoulder joint 64 may include a shoulder actuator 66 and an encoder 68 that rotate the arm about a shoulder axis 70.

The arm 50 also includes an elbow joint 72 with three degrees of freedom. Actuator 74 and encoder 76 can spin the first linkage 60 about an axis 78 essentially parallel to the longitudinal axis of the linkage 60. In a first mode of operation, actuator 80 and encoder 82 pivot the second linkage 62 about an elbow axis 84. In a second mode of operation the actuator 80 induces a sliding movement of the second linkage 62 essentially parallel with axis 85. The second mode of operation may occur when the second linkage 62 becomes essentially horizontal to axis 78. The horizontal position can be sensed by a sensor such as a potentiometer or positioner switch, computed by the robot, or switched through a user input.

Figure 3:
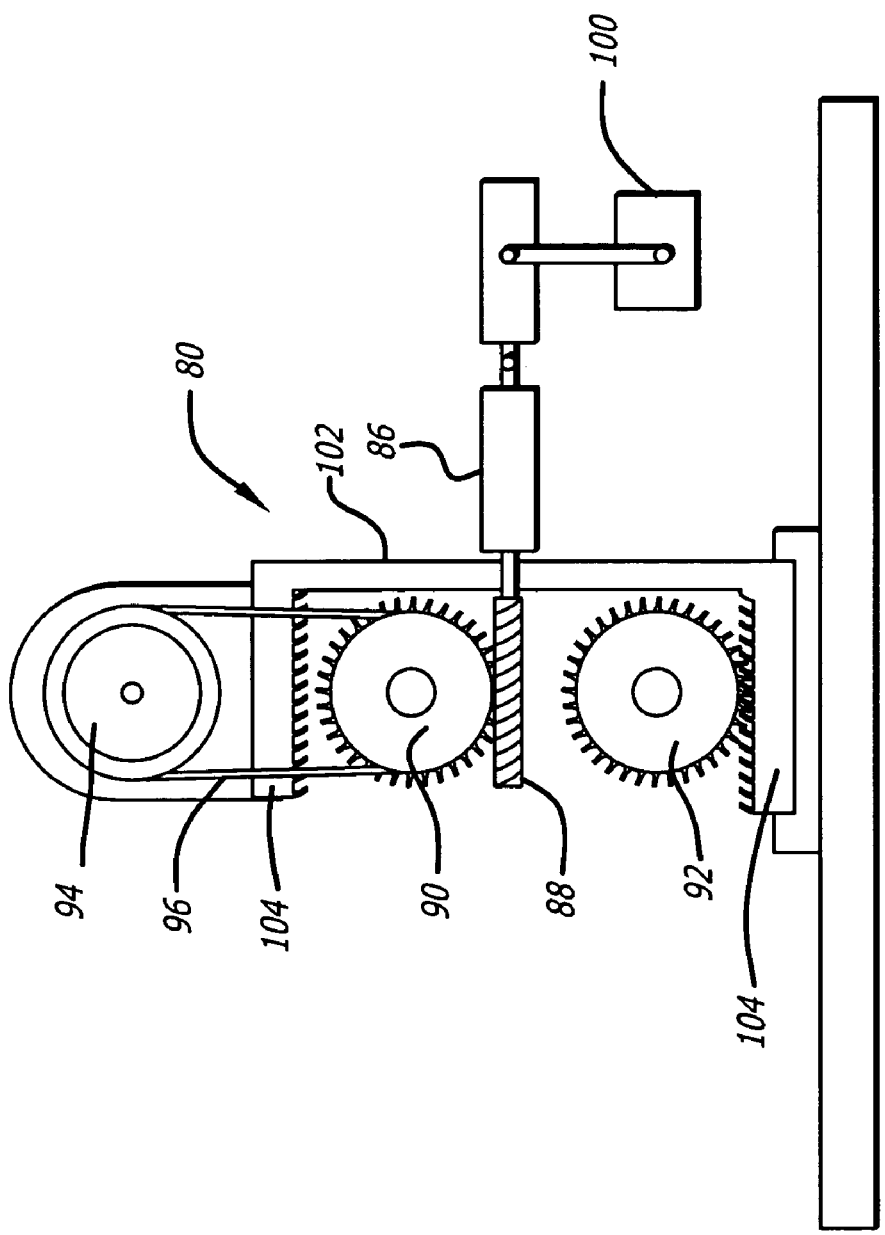
FIG. 3 is an illustration of an actuator assembly that can generate two degrees of freedom.

FIG. 3 shows an embodiment of the dual mode actuator 80. The actuator may have a motor 86 that is connected to a worm 88. The worm 88 can be coupled to either worm gear 90 or worm gear 92. Worm gear 90 is coupled to a sprocket 94 by a belt 96. Rotation of the gear 90 causes the second linkage 62 to pivot around elbow axis 84 (see FIG. 2). Rotation of gear 92 causes the second linkage 62 to slide relative to the elbow axis as indicated by the arrow 98 in FIG. 2. The motor 86 is coupled to a solenoid 100. The solenoid 100 can move the worm 88 into engagement with either worm gear 90 or worm gear 92. The motor 86 may be coupled to a stationary gear cage 102 with stationary worms 104 that lock either gear 90 or 92.

Referring to FIG. 2, the arm 50 may have a pair of graspers 106. Each grasper 106 may have a wrist joint 108. Each wrist joint 108 may include a motor 110 and an encoder 112 to rotate the grasper 106 about a wrist axis 114. The graspers 106 may each include motors 116 and encoders 118 that open and close grasper jaws 120 independently creating a grasping axis 125. The grasper 106 may also each have a motor 122 and encoder 124 that turn the jaws 120 as indicated by arrows 126. The graspers 106 may include force sensors that sense the force being exerted by the jaws 120.

As shown in FIGS. 4a–c, the arm 50 can be manipulated to grasp and push a wheelchair 130. The direction of wheelchair movement can be changed by activating actuator 80 and sliding the second linkage 62. For example, as shown in FIG. 4a movement of the second linkage to the left will cause a corresponding movement of the wheelchair to the right. Centering the second linkage 62 will allow straight movement of the wheelchair 130 as shown in FIG. 4b. As shown in FIG. 4c, rightward movement of the second linkage 62 will cause a leftward movement of the chair 130.

Figure 5:
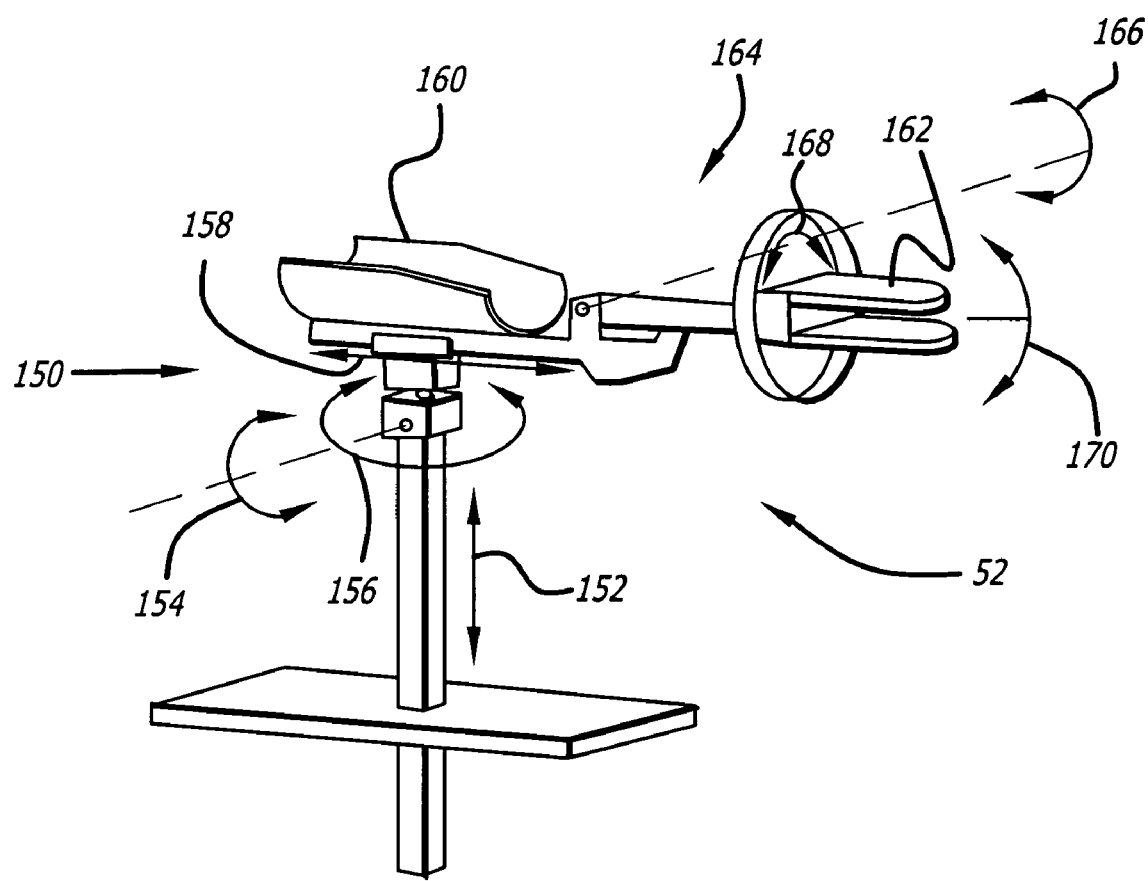
FIG. 5 is a perspective view of a handle used to control the robot arm.

FIG. 5 shows an embodiment of a handle 52 that can be manipulated by an end user to control the robot arm. The handle 52 includes a motor/encoder elbow joint assembly 150 that can sense movement as indicated by arrows 152, 154, 156 and 158. The motor/encoder assembly 150 may be coupled to an arm support plate 160.

The plate 160 may be coupled to a grasper 162 by a wrist assembly 164. The wrist assembly 164 and grasper may include motors and/or encoders (not shown) that sense movement as indicated by arrows 166, 168 and 170. The user may place their forearm onto the plate 160 and grab the grasper 162. Movement of the plate 160 is sensed by encoder assembly 150 which generates movement signals. The movement signals can be processed and then transmitted by the remote station computer 22 to the robot 12 through the network 18 (see FIG. 1). The movement commands cause corresponding movement of the shoulder 64 and elbow joints 72 of the manipulator arm 50 (see FIG. 2).

Likewise, manipulation of the grasper and wrist assembly are sensed by the handle, processed, transmitted and used to cause corresponding movement of the wrist joint 108 and graspers 106 of the robot.

When the manipulator arm is in the first mode of operation, movement of the handle elbow joint 150 will cause the second linkage 62 of the arm 50 to spin. When the manipulator arm is in the second mode of operation, movement at the handle elbow joint 150 will cause the second linkage to translate. This dual mode is particularly useful when used in an assisted living environment to push a wheelchair. The second linkage does not have to spin when pushing a wheel chair. When switched to the second mode, the elbow sensor commands from the handle can be used to change the direction of the wheelchair without requiring an additional sensor in the handle or another actuator for the manipulator arm.

Figure 6:
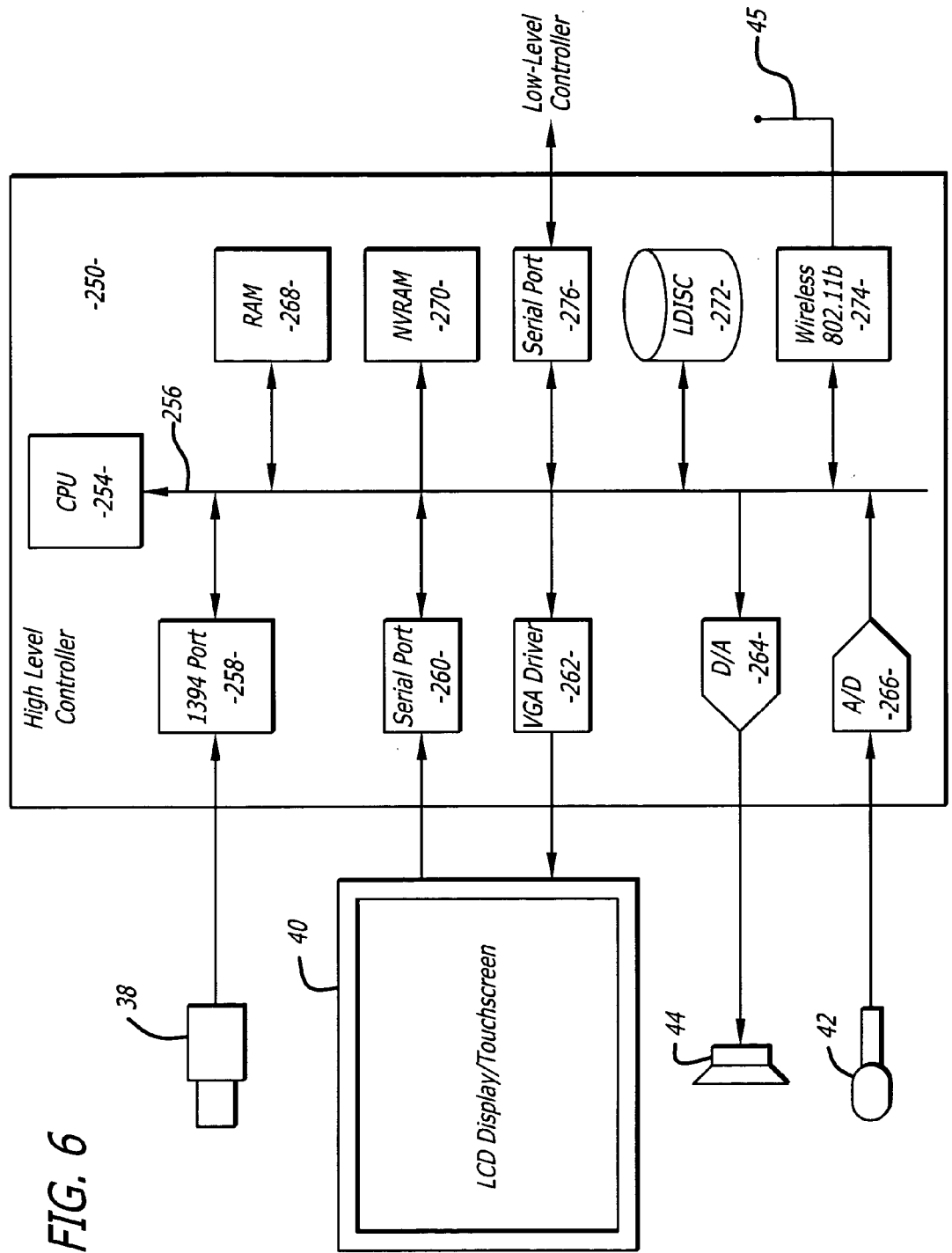
FIG. 6 is a schematic of an electrical system of a robot.
Figure 7:
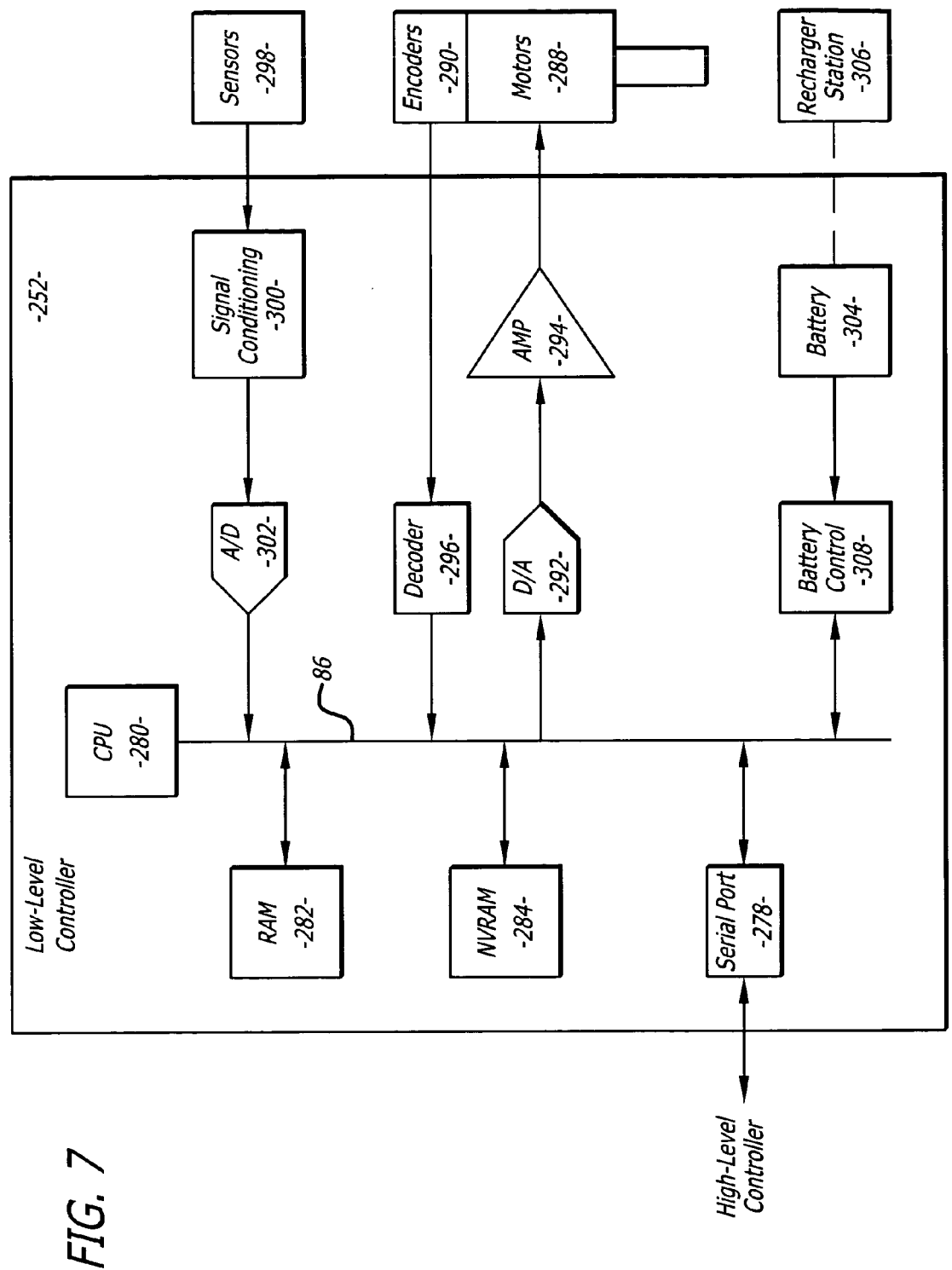
FIG. 7 is a further schematic of the electrical system of the robot.

FIGS. 6 and 7 show an embodiment of a robot 12. Each robot 12 may include a high level control system 250 and a low level control system 252. The high level control system 250 may include a processor 254 that is connected to a bus 256. The bus is coupled to the camera 38 by an input/output (I/O) port 258, and to the monitor 40 by a serial output port 260 and a VGA driver 262. The monitor 40 may include a touchscreen function that allows the patient to enter input by touching the monitor screen.

The speaker 44 is coupled to the bus 56 by a digital to analog converter 264. The microphone 42 is coupled to the bus 256 by an analog to digital converter 266. The high level controller 250 may also contain random access memory (RAM) device 268, a non-volatile RAM device 270 and a mass storage device 272 that are all coupled to the bus 262. The mass storage device 272 may contain medical files of the patient that can be accessed by the user at the remote control station 16. For example, the mass storage device 272 may contain a picture of the patient. The user, particularly a health care provider, can recall the old picture and make a side by side comparison on the monitor 24 with a present video image of the patient provided by the camera 38. The robot antennae 45 may be coupled to a wireless transceiver 274. By way of example, the transceiver 274 may transmit and receive information in accordance with IEEE 802.11b.

The controller 254 may operate with a LINUX OS operating system. The controller 254 may also operate MS WINDOWS along with video, camera and audio drivers for communication with the remote control station 16. Video information may be transceived using MPEG CODEC compression techniques. The software may allow the user to send e-mail to the patient and vice versa, or allow the patient to access the Internet. In general the high level controller 250 operates to control communication between the robot 12 and the remote control station 16.

The high level controller 250 may be linked to the low level controller 252 by serial ports 276 and 278. The low level controller 252 includes a processor 280 that is coupled to a RAM device 282 and non-volatile RAM device 284 by a bus 286. Each robot 12 contains a plurality of motors 288 and motor encoders 290. The encoders 290 provide feedback information regarding the output of the motors 288. The motors 288 can be coupled to the bus 286 by a digital to analog converter 292 and a driver amplifier 294. The encoders 290 can be coupled to the bus 286 by a decoder 296. The motors 288 and encoders 290 are collectively shown in one box but would include all of the motors and encoders for the arm 50 and platform 34. Each motor and encoder may have a D/A 292 and a decoder 296, respectively. Each robot 12 also has a number of proximity sensors 298 (see also FIG.

1). The position sensors 298 can be coupled to the bus 286 by a signal conditioning circuit 300 and an analog to digital converter 302.

The low level controller 252 runs software routines that mechanically actuate the robot 12. For example, the low level controller 252 provides instructions to actuate the movement platform 34 and the manipulator arm 50. The low level controller 252 may receive movement instructions from the high level controller 250. The movement instructions may be received as movement commands from the remote control station or another robot. Although two controllers are shown, it is to be understood that each robot 12 may have one controller, or more than two controllers, controlling the high and low level functions.

The various electrical devices of each robot 12 may be powered by a battery(ies) 304. The battery 304 may be recharged by a battery recharger station 306 (see also FIG. 1). The low level controller 252 may include a battery control circuit 308 that senses the power level of the battery 304. The low level controller 252 can sense when the power falls below a threshold and then send a message to the high level controller 250. The high level controller 250 may include a power management software routine that causes the robot 12 to move so that the battery 304 is coupled to the recharger 306 when the battery power falls below a threshold value. Alternatively, the user can direct the robot 12 to the battery recharger 306. Additionally, the battery 304 may be replaced or the robot 12 may be coupled to a wall power outlet by an electrical cord (not shown).

Figure 8:
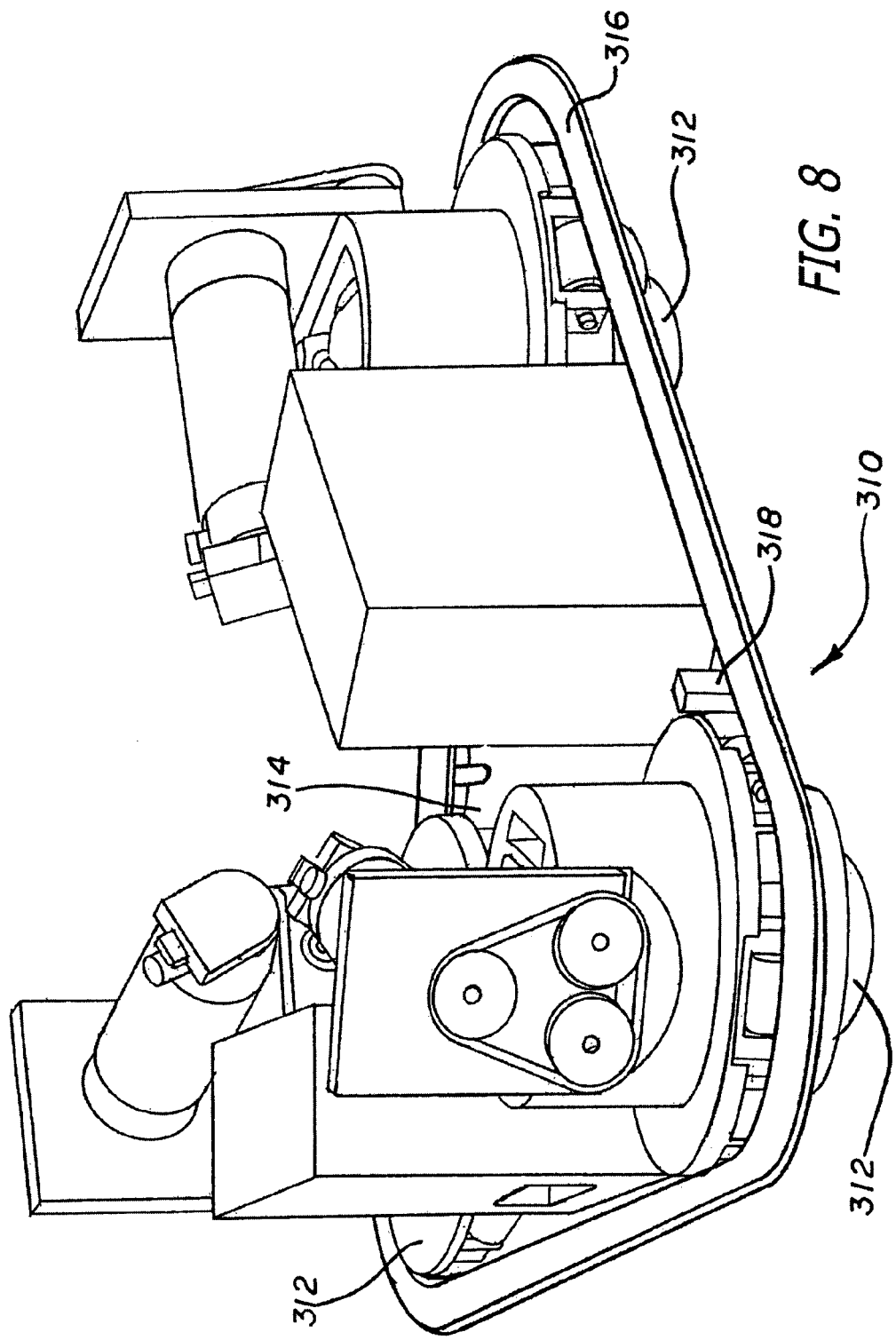
FIG. 8 is a top perspective view of a holonomic platform of the robot.

As shown in FIG. 8 the robot 12 may have an holonomic platform 310. The holonomic platform may include three roller assemblies 312 that are mounted to a base plate 314. The roller assemblies 312 allow for movement in any direction.

The robot housing 112 may include a bumper 316. The bumper 316 may be coupled to optical position sensors 318 that detect when the bumper 316 has engaged an object. After engagement with the object the robot can determine the direction of contact and prevent further movement into the object.

Figure 9:
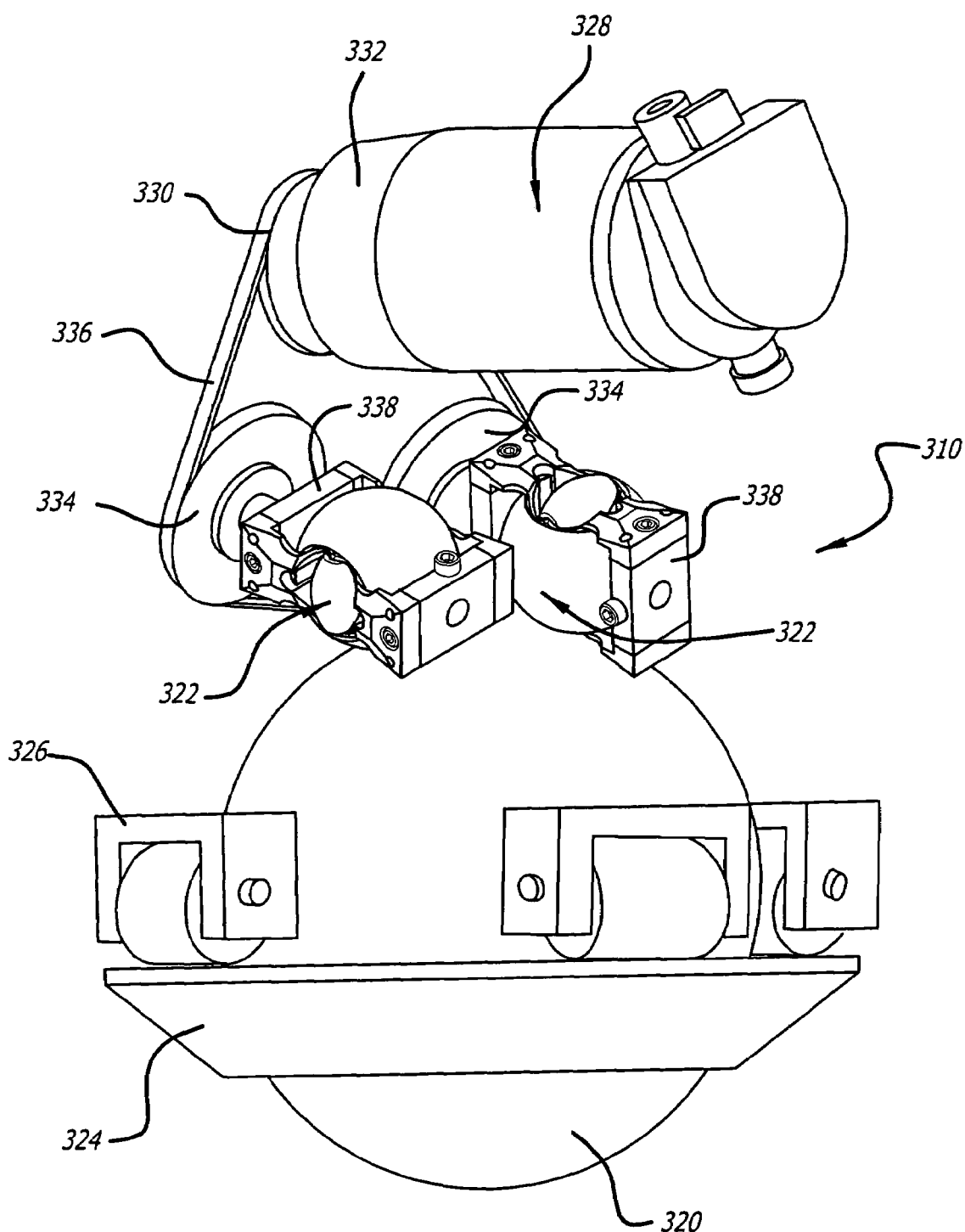
FIG. 9 is a side perspective view of a roller assembly of the holonomic platform.

FIG. 9 shows an embodiment of a roller assembly. Each assembly 310 may include a drive ball 320 that is driven by a pair of transmission rollers 322. The assembly 310 includes a retainer ring 324 and a plurality of bushings 326 that capture and allow the ball 320 to rotate in an x and y direction but prevents movement in a z direction.

The transmission rollers 322 are coupled to a motor assembly 328. The motor assembly 322 includes an output pulley 330 attached to a motor 332. The output pulley 330 is coupled to a pair of ball pulleys 334 by a drive belt 336. The ball pulleys 334 are each attached to a transmission bracket 338. The transmission rollers 322 are attached to the transmission brackets 338.

Rotation of the output pulley 330 rotates the ball pulleys 334. Rotation of the ball pulleys 334 causes the transmission rollers 322 to rotate and spin the ball 320 through frictional forces. Spinning the ball 320 will move the robot 12. The transmission rollers 322 are constructed to always be in contact with the drive ball 320. The brackets 338 allow the transmission rollers 322 to freely spin in a direction orthogonal to the driven direction when one of the other roller assemblies 310 is driving and moving the robot 12.

Figure 10:
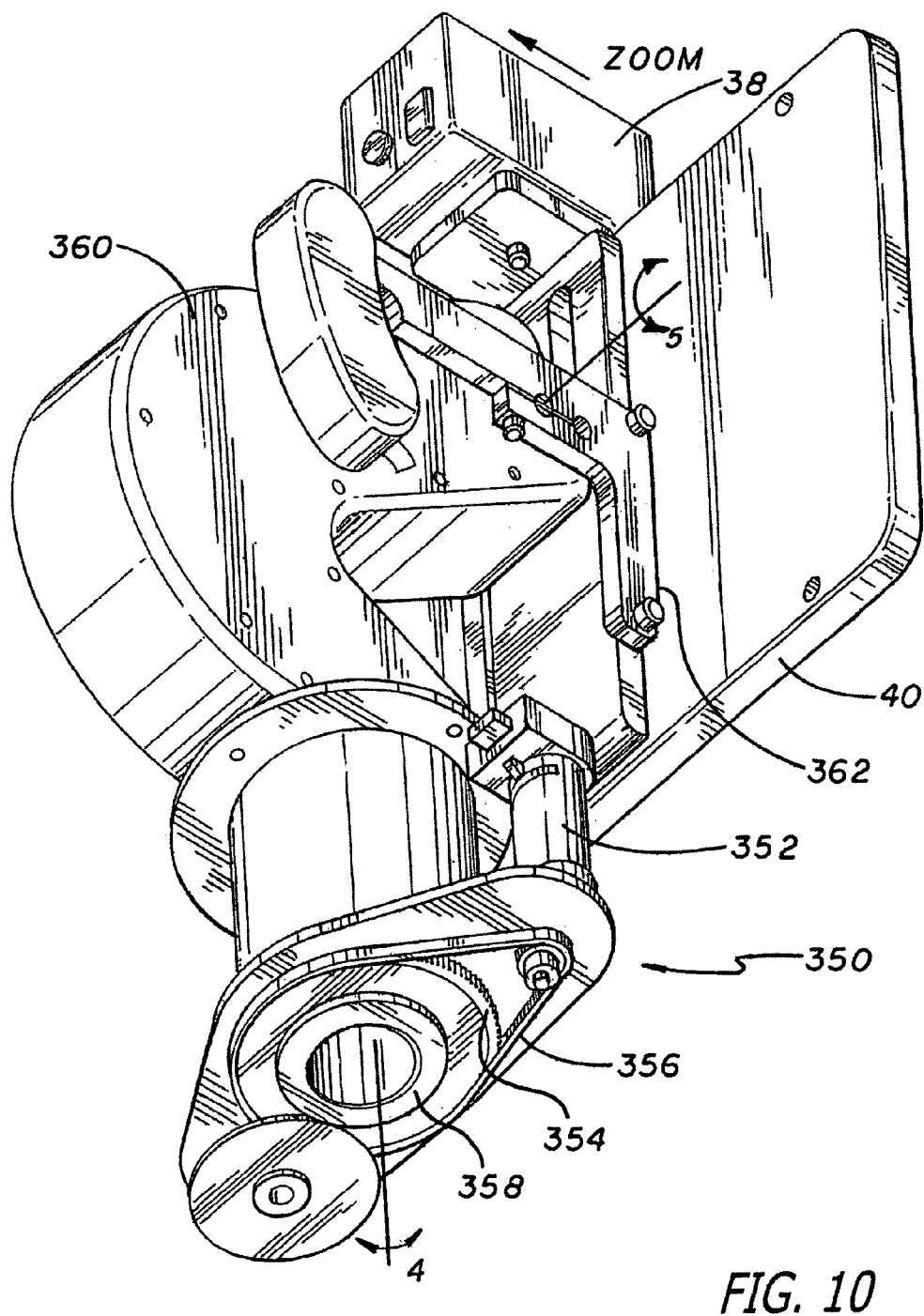
FIG. 10 is a bottom perspective view showing a pedestal assembly of the robot.

As shown in FIG. 10, the robot 12 may have a pedestal assembly 350 that moves the monitor 40 and camera 38 may include a motor 352 that is coupled to a gear 354 by a belt 356. The gear 354 is attached to a sleeve 358. The sleeve 358 is coupled to an arm 360 that is coupled to the camera 38 and monitor 40 by a bracket 362. Activation of the motor 352 rotates the gear 354 and sleeve 358, and causes the camera 38 and monitor 40 to swivel as indicated by the arrows 4.

Figure 11:
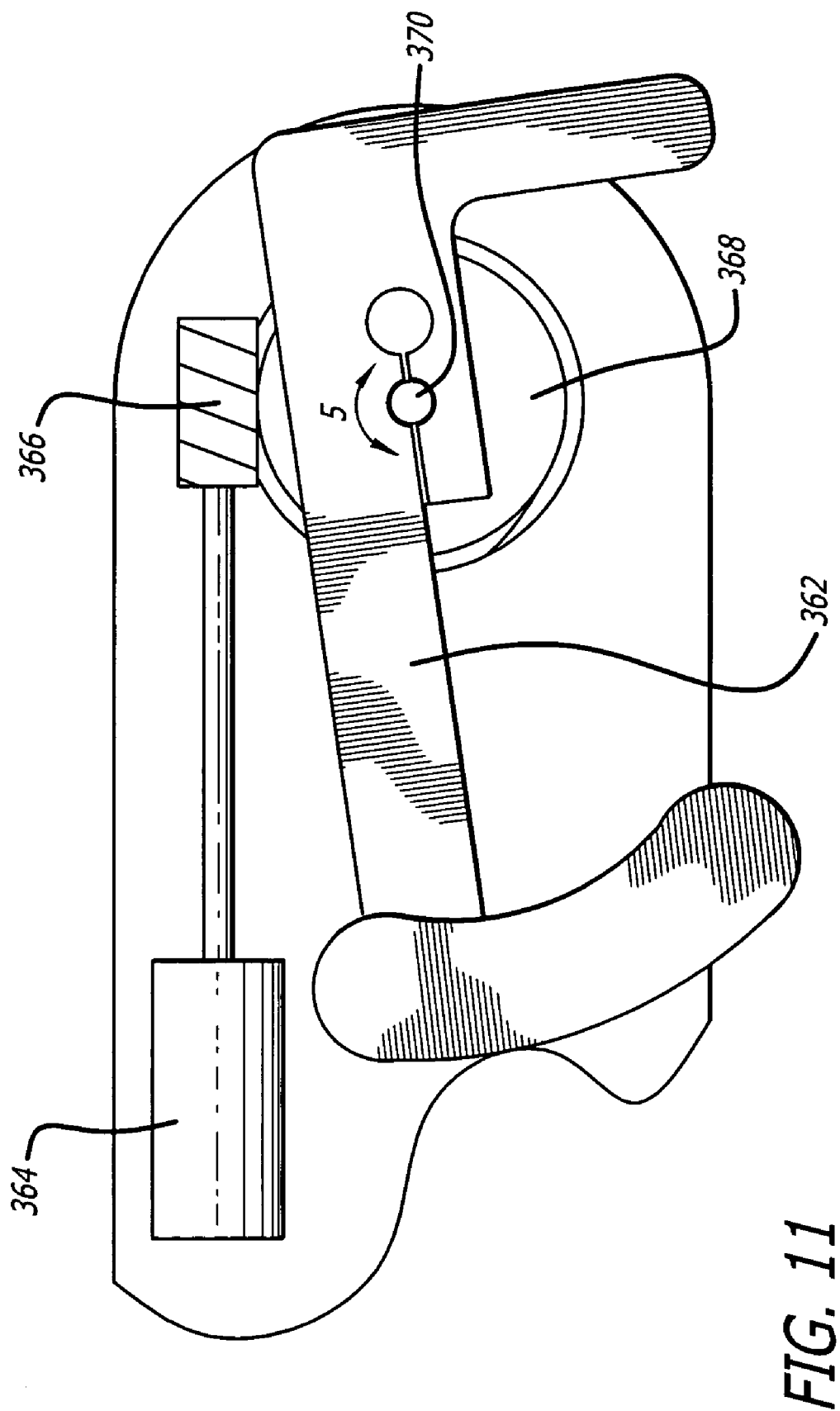
FIG. 11 is a sectional view showing an actuator of the pedestal assembly.

As shown in FIG. 11, the pedestal 350 may further include a tilt motor 364 within the arm 360 that can cause the monitor 40 and camera 38 to pivot as indicated by the arrows 5 in FIG. 10. The tilt motor 364 may rotate a worm 366 that rotates a worm gear 368. Pin 370 is rigidly attached to both the worm gear 368 and the bracket 362 so that rotation of the gear 368 pivots the camera 38 and the monitor 40. The camera 38 may also include a zoom feature to provide yet another degree of freedom for the operator.

In operation, each robot 12 may be placed in a home or a facility where one or more patients are to be monitored and/or assisted. The facility may be a hospital or a residential care facility. By way of example, the robot 12 may be placed in a home where a health care provider may monitor and/or assist the patient. Likewise, a friend or family member may communicate with the patient. The cameras and monitors at both the robot and remote control station allow for teleconferencing between the patient and the person at the remote station, or another robot.

Each robot 12 can be maneuvered through the home or facility by manipulating the input device 32 at the remote station 16. Each robot 10 may be controlled by a number of different users at the remote station(s) 16. To accommodate for this each robot may have an arbitration system. The arbitration system may be integrated into the operating system of the robot 12. For example, the arbitration technique may be embedded into the operating system of the high-level controller 250.

By way of example, the users may be divided into classes that include the robot itself, a local user, a caregiver, a doctor, a family member, or a service provider. These users may provide input from either a remote station or another robot. The robot may override input commands that conflict with robot operation. For example, if the robot runs into a wall, the system may ignore all additional commands to continue in the direction of the wall. A local user is a person who is physically present with the robot. The robot could have an input device that allows local operation. The same input device may also control a different robot.

A caregiver is someone who remotely monitors the patient. A doctor is a medical professional who can remotely control the robot and also access medical files contained in the robot memory. The family and service users remotely access the robot. The service user may service the system such as by upgrading software, or setting operational parameters.

Message packets may be transmitted between a robot 12 and a remote station 16 or between robots 12. The packets provide commands and feedback. Each packet may have multiple fields. By way of example, a packet may include an ID field a forward speed field, an angular speed field, a stop field, a bumper field, a sensor range field, a configuration field, a text field and a debug field.

The identification of remote users can be set in an ID field of the information that is transmitted from the remote control station 16 to the robot 12. For example, a user may enter a user ID into a setup table in the application software run by the remote control station 16. The user ID is then sent with each message transmitted to the robot.

Each robot 12 may operate in different modes; an exclusive mode, a sharing mode, or a remote station mode. In the exclusive mode only one user has access control of the robot. The exclusive mode may have a priority assigned to each type of user. By way of example, the priority may be in order of local, doctor, caregiver, family and then service user. In the sharing mode two or more users may share access with the robot. For example, a caregiver may have access to the robot, the caregiver may then enter the sharing mode to allow a doctor to also access the robot. Both the caregiver and the doctor can conduct a simultaneous teleconference with the patient.

The arbitration scheme may have one of four mechanisms; notification, timeouts, queue and call back. The notification mechanism may inform either a present user or a requesting user that another user has, or wants, access to the robot. The timeout mechanism gives certain types of users a prescribed amount of time to finish access to the robot. The queue mechanism is an orderly waiting list for access to the robot. The call back mechanism informs a user that the robot can be accessed. By way of example, a family user may receive an e-mail message that the robot is free for usage. Tables 1 and 2, show how the mechanisms resolve access request from the various users.

TABLE I

| User | Access Control | Medical Record | Command Override | Software/Debug Access | Set Priority |
|---|---|---|---|---|---|
| Robot | No | No | Yes (1) | No | No |
| Local | No | No | Yes (2) | No | No |
| Caregiver | Yes | Yes | Yes (3) | No | No |
| Doctor | No | Yes | No | No | No |
| Family | No | No | No | No | No |
| Service | Yes | No | Yes | Yes | Yes |

The information transmitted between the station 16 and the robot 12 may be encrypted. Additionally, the user may have to enter a password to enter the system 10. A selected robot is then given an electronic key by the station 16 or another robot 12. The robot 12 validates the key and returns another key to the station 16. The keys are used to encrypt information transmitted in the session.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A robot, comprising:
a mobile holonomic platform;
a camera coupled to said mobile holonomic platform;
an arm that has a first linkage and a second linkage that are coupled to said mobile holonomic platform, said arm having a single actuator that moves said second linkage relative to said first linkage in a first degree of freedom in a first mode, and in a second degree of freedom in a second mode; and,
a first grasper coupled to said arm.

2. The robot of claim 1, further comprising a monitor coupled to said mobile holonomic platform.

3. The robot of claim 1, wherein further comprising a shoulder actuator coupled to said arm.

TABLE II

| | | Requesting User | | | | |
|---|---|---|---|---|---|---|
| | | Local | Caregiver | Doctor | Family | Service |
| Current User | Local | Not Allowed | Warn current user of pending user Notify requesting user that system is in use Set timeout | Warn current user of pending user Notify requesting user that system is in use Set timeout = 5 m | Warn current user of pending user Notify requesting user that system is in use Set timeout = 5 m Call back | Warn current user of pending user Notify requesting user that system is in use No timeout Call back |
| | Caregiver | Warn current user of pending user. Notify requesting user that system is in use. Release control | Not Allowed | Warn current user of pending user Notify requesting user that system is in use Set timeout = 5 m Queue or callback | Warn current user of pending user Notify requesting user that system is in use Set timeout = 5 m | Warn current user of pending user Notify requesting user that system is in use No timeout Callback |
| | Doctor | Warn current user of pending user Notify requesting user that system is in use Release control | Warn current user of pending user Notify requesting user that system is in use Set timeout = 5 m | Warn current user of pending user Notify requesting user that system is in use No timeout Callback | Notify requesting user that system is in use No timeout Queue or callback | Warn current user of pending user Notify requesting user that system is in use No timeout Callback |
| | Family | Warn current user of pending user Notify requesting user that system is in use Release Control | Notify requesting user that system is in use No timeout Put in queue or callback | Warn current user of pending user Notify requesting user that system is in use Set timeout = 1 m | Warn current user of pending user Notify requesting user that system is in use Set timeout = 5 m Queue or callback | Warn current user of pending user Notify requesting user that system is in use No timeout Callback |
| | Service | Warn current user of pending user Notify requesting user that system is in use No timeout | Notify requesting user that system is in use No timeout Callback | Warn current user of request Notify requesting user that system is in use No timeout Callback | Warn current user of pending user Notify requesting user that system is in use No timeout Queue or callback | Not Allowed |

4. The robot of claim 1, wherein said arm has an elbow actuator.

5. The robot of claim 1, wherein said first grasper is coupled to a wrist joint of said arm.

6. The robot of claim 1, further comprising a second grasper coupled to said arm.

7. The robot of claim 1, wherein said first degree of freedom pivots about an elbow axis and said second degree of freedom slides relative to the elbow axis.

8. A robot system, comprising:
   a broadband network;
   a remote station coupled to said broadband network, said remote station having a handle that can be manipulated to generate movement signals that are transmitted through said broadband network;
   a robot that is coupled to said broadband network and receives said movement signals from said handle of said remote station, said robot including;
   a mobile holonomic platform;
   a camera coupled to said mobile holonomic platform;
   an arm coupled to said mobile holonomic platform, said arm includes a first linkage, and a second linkage coupled to said first linkage, said arm further having a single actuator that moves said second linkage relative to said first linkage in a first degree of freedom in a first mode, and in a second degree of freedom in a second mode in response to said movement signals; and,
   a first grasper coupled to said arm.

9. The robot system of claim 8, further comprising a monitor coupled to said mobile holonomic platform.

10. The robot system of claim 8, wherein further comprising a shoulder actuator coupled to said arm.

11. The robot system of claim 8, wherein said arm has an elbow actuator.

12. The robot system of claim 8, wherein said first grasper is coupled to a wrist joint of said arm.

13. The robot system of claim 8, further comprising a second grasper coupled to said arm.

14. The robot system of claim 8, wherein said first degree of freedom pivots about an elbow axis and said second degree of freedom slides relative to the elbow axis.

* * * * *